Sept. 14, 1926.
C. O. SANTESSON
1,599,722
HYDRAULIC CLUTCH AND TRANSMISSION
Filed August 18, 1925
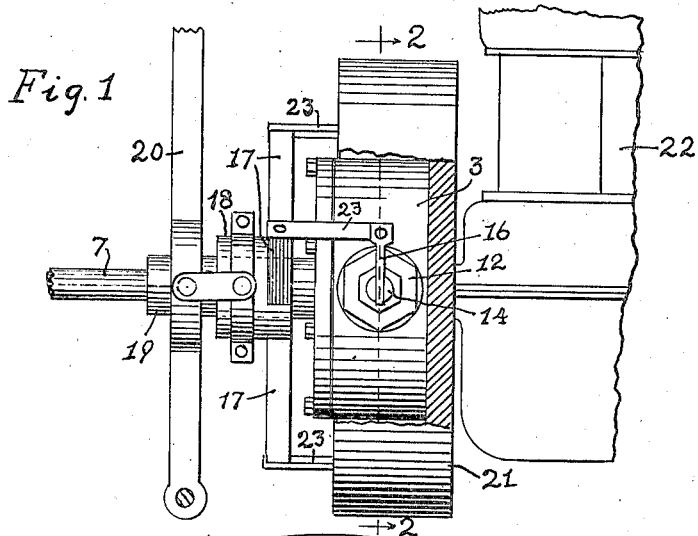
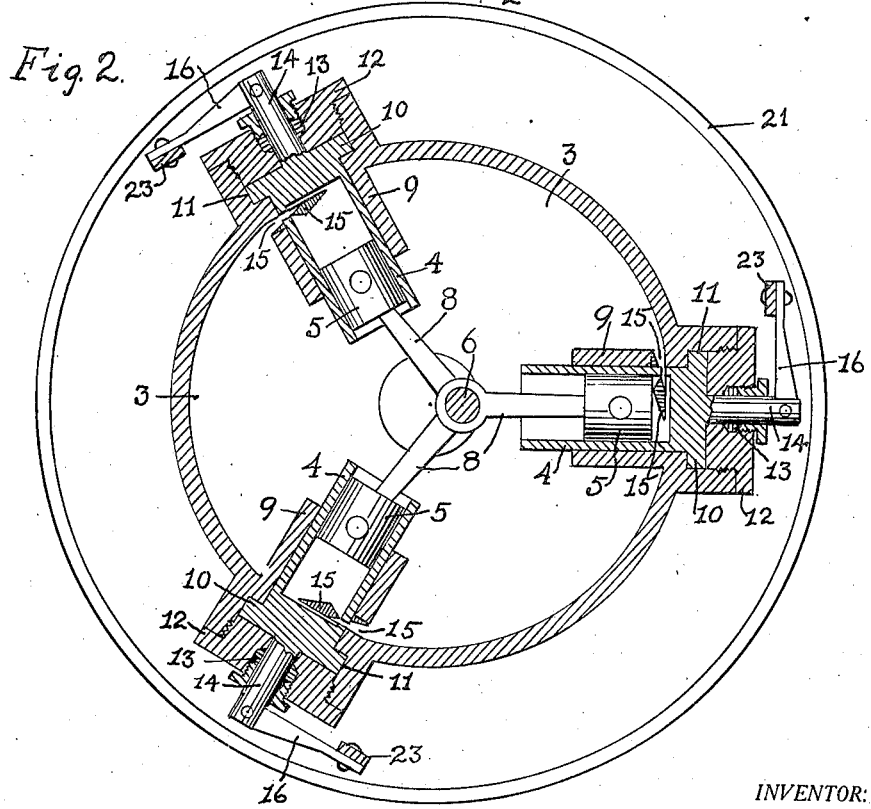
INVENTOR:
Carl O Santesson,
BY Frank McClintock,
ATTORNEY.

Patented Sept. 14, 1926.

1,599,722

UNITED STATES PATENT OFFICE.

CARL OLAV SANTESSON, OF DUCHESNE, UTAH.

HYDRAULIC CLUTCH AND TRANSMISSION.

Application filed August 18, 1925. Serial No. 50,969.

My invention relates to an improved clutch and transmission combined in a single device which is especially adapted for use in automobiles having internal combustion engines as the motive power; and the object of my improvement is to provide a simple and compact mechanism whereby any desired ratio of speed and power between the driving and driven shafts may be secured by means of a single controlling lever.

I attain this object by means of the mechanism shown in the accompanying sheet of drawings in which:

Figure 1 is a side elevation of the device as applied to an automobile, connecting the crank-shaft of the engine with the propeller shaft of the chassis.

Figure 2 is a sectional view, on the line 2, 2, of Figure 1, showing the internal construction of the device.

Similar reference letters refer to similar parts in each of the views. The invention consists essentially of a cylindrical reservoir, 3, into the outer wall of which are inserted a plurality of cylinders, 4, provided with pistons 5. Three of these cylinders and pistons are shown in the present design but it will be evident that any other desired number may be used although a less number than three is not desirable on account of liability at slow speeds of being stalled on dead centers. The pistons are connected to a crank 6 on the inner end of the propellor shaft 7 by the connecting rods 8. The cylinders 4 must be retained within the reservoir 3 in such a manner that they may be given a rotary reciprocating movement and at the same time be securely held against any longitudinal movement.

The construction shown consists of inwardly projecting lugs 9 which are bored to such diameter that the outer finished diameter of the cylinders will have a free running fit therein. The heads of the cylinders 4 are provided with flanges 10 which fit freely into the larger bores 11 in the outer ends of the lugs 9. It will be evident that the cylindrical lugs 9 may be integral with the outer wall of the reservoir 3 as shown, or separate tubular sections may be inserted into suitable openings in the outer wall. The cylinders 4 are securely retained within the lugs 9 by means of the screw plugs 12 which are provided with circular openings 13, having a suitable packing nut as shown, through which the shafts 14 on the heads of the cylinders 4 extend. Openings or ports 15 are provided in the walls of both the cylindrical lugs 9 and the cylinders 4. The number and total area of these ports should be sufficient to allow the liquid, preferably oil, which is placed within and entirely fills the reservoir including the clearance above the piston heads, to flow freely in and out through such ports when opened to their maximum area, when the pistons are caused to reciprocate by the rotation of the reservoir.

In order that the area of the ports 15 may be simultaneously varied or entirely closed at will, the short levers 16 are secured to the outer ends of the cylinder head shafts 14. The outer ends of the levers 16 are suitably connected to the radial arms 17 of a sliding sleeve 18 by means of the pivoted arms 23. This sleeve is prevented by a longitudinal key or other equivalent means from any rotation relative to the hub 19 of the cylindrical reservoir, but may be given a free longitudinal movement by means of the control lever 20. Such longitudinal movement will cause the simultaneous rotation of the cylinders 4 on their axes thereby varying the open area of the ports, or entirely closing them at will.

In the construction as shown in Figure 1, the body of the reservoir is integral with or rigidly secured to the fly wheel 21 of the automobile engine 22. Since the crank pin 6, to which the piston connecting rods 8 are connected, is an integral part of the propeller shaft 7, it will be evident that when the cylinders 4 are rotated to such position as to entirely close the ports 15 the non-compressible liquid retained within the cylinders will prevent the reciprocating movement of the pistons 5 and therefore the propeller shaft will be driven at substantially the same speed as the engine crank shaft. When the ports 15 are caused to open simultaneously by the movement of the control lever 20, in the manner heretofore described, the flow of the liquid through the partially opened ports will cause the rotation of the engine crank shaft and the propeller drive shaft 7 at variable speeds, proportional to the varying open area of the ports.

When the ports 15 are fully opened the pistons can be reciprocated freely by the rotation of the reservoir without causing the rotation of the propeller shaft 7. The total volume of the oil, or other suitable liquid contained in the reservoir, being considerably greater than that required to fill the piston displacement volume of the cylinders, there will be but little rise in the temperature when transmitting power at a variable speed. When the ports are entirely closed and the device is used for direct drive there will be no circulation of oil nor movement of the elements of the mechanism.

What I claim as my invention is:

1. In a transmission clutch the combination with a reservoir containing a liquid, of radially located cylinders therein, bearings for retaining the cylinders securely against longitudinal movement while permitting rotary movement, similar ports located in the walls of the cylinders and bearings, pistons fitted in the cylinders, a propeller shaft terminating with a crank within the reservoir, a connecting rod from each piston to said crank, and means for causing a simultaneous reciprocating rotary movement of the cylinders.

2. In a transmission clutch the combination with a reservoir containing a liquid, radially located cylinders therein, bearings for retaining the cylinders securely against longitudinal movement while permitting rotary movement, similar ports located in the walls of the cylinders and bearings, pistons fitted in the cylinders, a propeller shaft terminating with a crank within the reservoir, a connecting rod from each piston to said crank, axial shafts extending from the cylinder heads out through the reservoir wall with levers secured thereto, a sliding sleeve provided with radial arms and connecting links between said radial arms and the levers on the cylinder head shafts.

In testimony whereof I hereto affix my signature.

CARL OLAV SANTESSON.